(12) United States Patent
Barber et al.

(10) Patent No.: US 7,526,891 B2
(45) Date of Patent: May 5, 2009

(54) ARTIFICIAL FLY FISHING LURE

(76) Inventors: David Barber, 3216 Sheehan Rd., Camden, NY (US) 13316; Michael Treger, 1504 Broadway Rd., Lutherville, MD (US) 21093

( * ) Notice: Subject to any disclaimer, the term of this patent is extended or adjusted under 35 U.S.C. 154(b) by 0 days.

(21) Appl. No.: 11/703,536

(22) Filed: Feb. 7, 2007

(65) Prior Publication Data
US 2008/0005954 A1    Jan. 10, 2008

Related U.S. Application Data

(60) Provisional application No. 60/771,149, filed on Feb. 7, 2006.

(51) Int. Cl.
*A01K 85/00* (2006.01)
(52) U.S. Cl. .................... 43/42.53; 43/42.25; 43/42.36; 43/42.05
(58) Field of Classification Search ............... 43/42.53, 43/42.36, 42.35, 42.25, 42.05, 42.37; D22/126
See application file for complete search history.

(56) References Cited

U.S. PATENT DOCUMENTS

| | | | |
|---|---|---|---|
| 810,822 A | 1/1906 | Tinkess | |
| 859,144 A | 7/1907 | Stanley | |
| 934,087 A | 9/1909 | Moran | |
| 958,233 A | 5/1910 | Curtiss | |
| 1,546,105 A | 7/1925 | Powell | |
| 1,582,171 A | 4/1926 | Foss | |
| 1,737,683 A | 12/1929 | Readman | |
| 1,913,282 A * | 6/1933 | Major | 43/42.05 |
| 2,091,457 A | 8/1937 | Sauer | |
| 2,176,803 A | 10/1939 | Rosselle | |
| 2,183,816 A | 12/1939 | Lovelace | |
| 2,231,507 A | 2/1941 | Richards | |
| 2,235,331 A | 3/1941 | Pugh | |
| 2,295,765 A | 9/1942 | Weber | |
| 2,402,853 A | 6/1946 | Sweeney | |
| 2,462,828 A | 2/1949 | Parnell | |
| 2,518,487 A | 8/1950 | Metz | |
| 2,557,577 A | 6/1951 | Soma | |
| 2,623,321 A | 12/1952 | Braukus | |
| 2,645,052 A | 7/1953 | Schiller | |
| 2,713,742 A | 7/1955 | Holdaway | |
| 2,750,701 A | 6/1956 | Beames | |
| 3,010,243 A * | 11/1961 | Dickinson | 43/42.09 |
| 3,205,609 A | 9/1965 | Knapton | |
| 3,226,874 A | 1/1966 | Boyd | |
| 3,323,248 A | 6/1967 | Sutryn | |

(Continued)

FOREIGN PATENT DOCUMENTS

DE    19544873 A1    6/1997

(Continued)

*Primary Examiner*—Kurt Rowan
(74) *Attorney, Agent, or Firm*—Whiteford, Taylor & Preston LLP; Gregory M. Stone

(57) ABSTRACT

An artificial fly fishing lure is provided having a hollow tube, a lip extending downward from the tube and integrally formed with the tube to impart life-like movement to the fly when pulled through the water, an anchoring point for connecting a leader line to the fly near a back end thereof, and preferably a notch for receiving and frictionally holding in place a dumbbell or hourglass weight for varying the depth and flow dynamics of the fly.

18 Claims, 2 Drawing Sheets

U.S. PATENT DOCUMENTS

| | | | |
|---|---|---|---|
| 3,400,484 A | 9/1968 | Beard | |
| 3,426,467 A | 2/1969 | Bryant | |
| 3,477,164 A | 11/1969 | Novak | |
| 3,885,339 A | 5/1975 | Herkner | |
| 3,914,895 A * | 10/1975 | Mize | 43/42.05 |
| 3,921,328 A | 11/1975 | Holcombe | |
| 3,964,202 A | 6/1976 | Ruppa | |
| 4,098,017 A | 7/1978 | Hall | |
| 4,163,337 A | 8/1979 | Kress | |
| 4,163,338 A | 8/1979 | Lucarini | |
| 4,542,607 A | 9/1985 | Cartwright | |
| 4,667,435 A | 5/1987 | Fujimoto | |
| 4,709,499 A | 12/1987 | Ottaviano | |
| 4,790,101 A | 12/1988 | Craddock | |
| 4,796,378 A | 1/1989 | Krueger et al. | |
| 4,858,368 A | 8/1989 | Tolner et al. | |
| 4,870,776 A | 10/1989 | Schock | |
| 4,881,340 A | 11/1989 | Davis | |
| 4,930,249 A | 6/1990 | Johns | |
| 4,987,695 A | 1/1991 | Preiser | |
| 5,119,581 A | 6/1992 | Rudolph | |
| 5,142,811 A | 9/1992 | Freeman | |
| 5,199,209 A | 4/1993 | Cook | |
| 5,207,016 A * | 5/1993 | Pate | 43/42.28 |
| 5,351,433 A | 10/1994 | Ellis | |
| 5,444,935 A | 8/1995 | Pahle | |
| 5,775,024 A | 7/1998 | Hnizdor | |
| 5,787,633 A | 8/1998 | Taylor | |
| 5,956,887 A | 9/1999 | Mostovsky | |
| 6,035,574 A | 3/2000 | Ware | |
| 6,131,328 A | 10/2000 | Menne | |
| 6,131,329 A | 10/2000 | Kageyama | |
| 7,254,917 B2 * | 8/2007 | Brickett | 43/42.02 |
| 2001/0029692 A1 | 10/2001 | Imamura | |
| 2003/0024149 A1 | 2/2003 | Imamura | |
| 2004/0060224 A1 | 4/2004 | Churches | |
| 2004/0231225 A1 * | 11/2004 | Okada | 43/42.36 |
| 2006/0260178 A1 * | 11/2006 | Jones et al. | 43/42.36 |

FOREIGN PATENT DOCUMENTS

| | | |
|---|---|---|
| DE | 29704961 U1 | 7/1997 |
| GB | 19431 | 0/1892 |
| GB | 1224134 | 3/1971 |
| GB | 2011771 A | 7/1979 |
| GB | 2238938 A | 6/1991 |
| GB | 2268673 A | 1/1994 |
| GB | 2382968 A | 6/2003 |
| JP | 8266192 A | 3/1995 |
| WO | 0070946 A1 | 11/2000 |

* cited by examiner

ARTIFICIAL FLY FISHING LURE

CROSS-REFERENCE TO RELATED APPLICATIONS

This application is based upon and claims benefit of copending and co-owned U.S. Provisional Patent Application Ser. No. 60/771,149 entitled "Artificial Fly Fishing Lure", filed with the U.S. Patent and Trademark Office on Feb. 7, 2006, by the inventors herein, the specification of which is incorporated herein by reference.

BACKGROUND OF THE INVENTION

1. Field of the Invention

This invention relates to fishing lures, and more particularly to a fly fishing "fly" body having a lip, tube, and line anchoring construction for providing life-like movement to an artificial fly.

2. Background

The sport of fishing is ancient. While used over the millennia as a form of providing sustenance, it remains such today, but also provides an intriguing sport to enthusiasts. Rewards are sought by the participants of such sport in the form of not only large catches, but likewise in enjoying the "chase" itself, i.e., the fishing experience. One particular field of sport fishing that continues to grow in popularity is fly fishing, in which a nearly weightless lure, known as a "fly," is used to stimulate a strike and attract fish on top of or beneath the water surface, mimicking food types that attract fish. The appearance of such fly, i.e., the colors and pattern of the materials, such as feathers, hair, synthetics, etc., used to construct the fly, can be an important factor in attracting particular types of fish. However, of even greater import is the movement of the fly— generally, the more lifelike the movement, the greater the performance in attracting fish.

Attempts have been made to provide lures, including flies, with various constructions to aid in a lifelike presentation of the lures or flies to the targeted fish. However, given that flies used in fly fishing must have minimal weight, the options for adding structures to provide life-like movement have been limited. Thus, there remains a need in the art for a fly having a construction that provides for life-like movement of the fly through the water, but that remains simple in construction so as to not excessively weight the fly, or cause wind resistance when casting with a fly line and rod.

SUMMARY OF THE INVENTION

Disclosed is a fly fishing lure (a "fly") having a construction adapted for life-like movement of the fly through the water. The fly is comprised of a hollow tube having a generally circular, concave lip positioned along the tube, positioned toward and facing a front end of the tube (which receives the leader from a fly fishing line). A sleeve is preferably fitted to the back end of the tube and receives the eyelet of a fishing hook, and the leader extends through the hollow tube and attaches to the fishing hook at the back end of the tube. By extending the leader through the hollow tube and anchoring it at a point at the back end of the tube, the fly pivots about such rear anchor point when the fishing line and the leader are pulled in various directions. Moreover, a clearance exists at the front of the tube between the leader and the interior walls of the tube, allowing the leader to move freely in such clearance, thus (in combination with the lip) imparting a more life-like movement to the fly. A notch is preferably provided behind the lip to receive a dumbbell or hourglass weight, the notch being sized to frictionally receive and hold such weight until it is lashed or otherwise affixed to the tube.

Thus, with respect to one aspect of a particularly preferred embodiment of the invention, the invention relates to a fly fishing lure having a hollow tube, a downwardly projecting lip on an exterior of the tube adjacent a forward end of the tube, a hook engaged with the tube adjacent a back end of the tube, and a leader line extending through the forward end of the tube and attached to an eyelet of the hook at the back end of the tube so as to allow pivoting of the leader line with respect to an interior of the tube.

With respect to another aspect of a particularly preferred embodiment of the invention, the invention relates to a method of making a fly fishing lure including the steps of providing a hollow tube having a forward end, a back end opposite the forward end, and a downwardly projecting lip adjacent the forward end, extending a leader line through the hollow tube from the forward end through the back end, tying an eyelet of a hook to the leader line adjacent the back end of the tube, and positioning the eyelet of the hook with respect to the interior of the tube so that the leader line extends from approximately the center of the tube at approximately the back end of the tube towards the forward end of the tube.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and exemplary embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
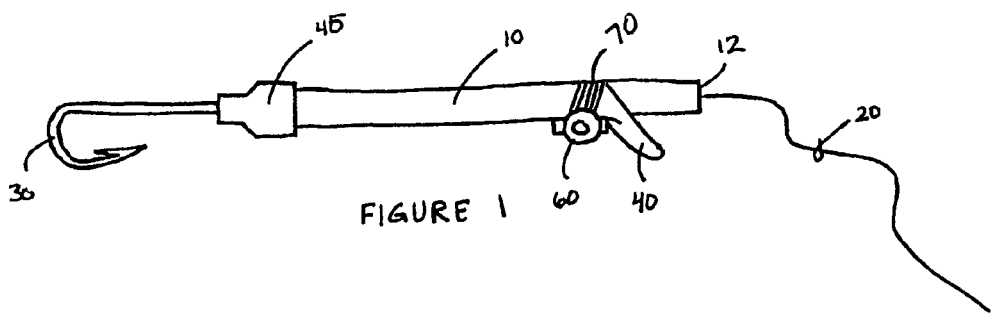
FIG. 1 is a side view of an artificial fly fishing lure construction according to one embodiment of the instant invention.
Figure 2:
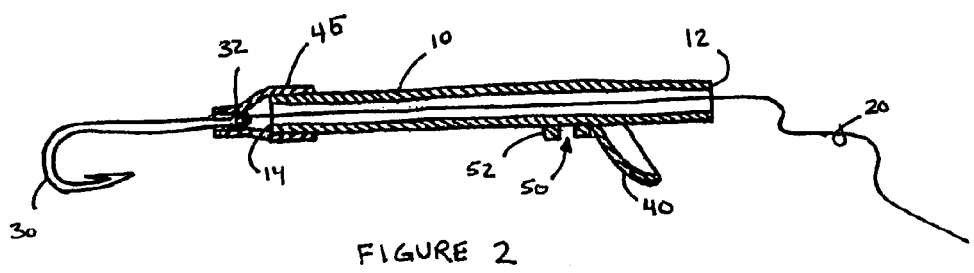
FIG. 2 is a sectional view of the artificial fly fishing lure construction of FIG. 1.
Figure 2A:
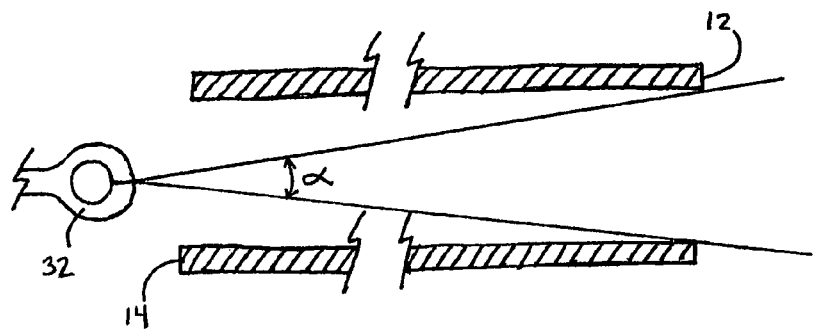
FIG. 2a is a close-up sectional view of the artificial fly fishing lure construction of FIGS. 1 and 2.
Figure 3:
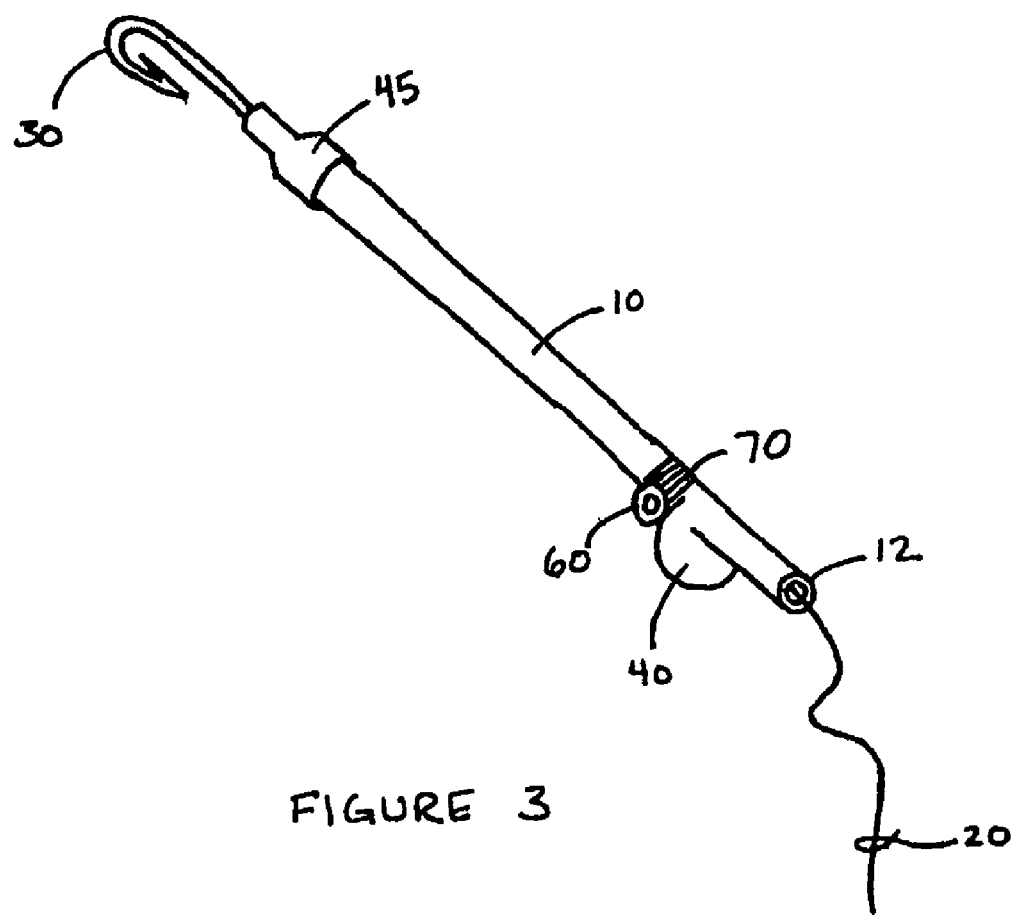
FIG. 3 is a perspective view of the artificial fly fishing lure construction of FIG. 1.

In a particularly preferred embodiment of the invention, and as shown in the side view of FIG. 1 and the side, sectional view of FIG. 2, a fly includes a hollow tube 10, preferably formed of light weight plastic for ease of manufacture in a molding apparatus. The hollow tube 10 has a front end 12 and a back end 14. A leader 20, which extends from a fly fishing line (not shown), enters hollow tube 10 through front end 12 and extends towards back end 14 toward a hook 30. Hook 30 is provided an eyelet 32 for receiving a free end of leader 20. As particularly shown in FIG. 2, leader 20 is tied or otherwise affixed to eyelet 32 adjacent back end 14 of hollow tube 10. Thus, when the fishing line (and thus leader 20) is pulled at an angle with respect to the longitudinal axis of hollow tube 10, tube 10 may pivot with respect to leader 20 about the point at which it connects to eyelet 32. By having such anchor point at the back end 14 of tube 10, a clearance results between the leader 20 and the interior walls of tube 10 at the front end 12 thereof. Thus, when leader 20 is pulled at an angle with respect to the longitudinal axis of hollow tube 10, leader 20 is able to move freely in such clearance, thus allowing angular displacement a (FIG. 2a) of the line inside of hollow tube 10. This angular displacement a of leader 20 inside of hollow tube 10 is expected to allow pulls of the fly in various directions to impart a greater degree of varied motion than if leader 20 were attached at or near front end 12 of tube 10, thus imparting a more life-like motion to the fly.

Preferably, a sleeve 45 is provided surrounding the back end 14 of tube 10 and the eyelet 32 of hook 30, thus fixing the position of eyelet 32 with respect to tube 10. Optionally, eyelet 32 may instead be seated in and preferably frictionally held within hollow tube 10 adjacent the back end 14 thereof.

To add to the life-like motion of the fly, a lip 40 is provided adjacent front end 12 of tube 10. Lip 40 is preferably in the form of a concave disc, with the open concave face of the disc facing front end 12 of tube 10 (and the convex outer face of the disc facing back end 14 of tube 10). The disc is situated at an angle, preferably at least 45°, to the longitudinal axis of tube 10. Lip 40 is preferably formed as an integral unit with tube 10 in a single molding operation for ease of manufacture, and is positioned with respect to tube 10 so that an uppermost portion of the disc formed by lip 40 does not extend above the top edge of tube 10. The concave shape and angular orientation of lip 40 are expected to create resistance against water as the fly is pulled through the water, causing the fly to exhibit more life-like movement than if no lip were provided. To add to the stability of the fly as it is pulled through the water (and subjected to the resistance provided by lip 40), tube 10 is configured and particularly sized with respect to leader 20 and hook 30 to allow water to flow through the hollow interior of tube 10 as it is pulled through the water. Such water flow aids the stability of the fly as it is pulled through the water, balancing the tendency of the lip and the rear anchor point of leader 20 to cause erratic movements with a stable flow through the interior, thus providing a more life-like movement of the fly through the water.

Preferably positioned behind lip 40 is a notch 50 (FIG. 2) configured to temporarily position and optionally hold a dumbbell or hourglass weight 60 of traditional configuration. Such weight may be painted or otherwise decorated to simulate the eyes of the creature or food that the fly is intended to simulate. Such weight also traditionally serves as added mass to allow the fly (with varied movements of the fishing line and leader 20) to dive and climb in the water and otherwise respond to movements of the line by the angler without inadvertently jumping out of the water or turning on its side. Notch 50 is preferably defined by two ridges, blocks, detents, or similarly configured locating mechanism 52 preferably integrally formed with tube 10 on the outer surface thereof (and thus not interfering with the generally cylindrical interior of flow channel extending through tube 10). Notch 50 is sized to receive the arm of dumbbell weight 60 and to frictionally hold the same in position with respect to tube 10 during assembly of the fly. Moreover, as notch 50 has a lateral thickness, it preferably provides a channel for receiving the arm of weight 60, thus aligning weight 60 with respect to the longitudinal axis of tube 10 (and particularly at preferably a right angle thereto), ensuring a proper alignment of weight 60 during assembly of the fly. Once the weight is positioned in notch 50, it may be lashed 70 to tube 10 along with feathers and/or other decorative elements to simulate a specific food.

While hollow tube 10 is depicted as having a generally circular cross section, it should be noted that alternate configurations could be used without departing from the spirit and scope of the invention. For instance, tube 10 may be square, triangular, diamond, oval, or any other shape that facilitates permanent attachment of lip 40 and is hollow through its center to provide a flow channel through tube 10. Likewise, while lip 40 is preferably circular, it may take on other shapes, such as square, rectangular, circular, oval, or any other shape, and may be situated with respect to tube 10 at various angles. Lip 40 may have different surface contours such as flat, convex, or concave, and may be provided elevations or depressions in its forward facing surface to help facilitate the determined motion of the fly desirable for the species of fish that is targeted. The tube and lip may be constructed of various materials including but not limited to plastics, resins, and metals. Use of different materials and shapes for tubes and lips as well as the other variables described above will provide for differences in floating and/or sinking capabilities and enhance the desired movement of the flies so constructed.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art could modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof It should be understood, therefore, that the invention may be practiced otherwise than as specifically set forth herein. Consequently, the present embodiments are to be considered in all respects as illustrative and not restrictive.

We claim:

1. A fly fishing lure comprising:
   a hollow tube having a forward end and a back end opposite said forward end;
   wherein said hollow tube further comprises a notch on an exterior bottom wall of said hollow tube configured to hold a weight on the exterior of said tube;
   a downwardly projecting lip adjacent said forward end of said tube;
   a hook engaged with said tube and having an eyelet, said eyelet positioned adjacent said back end of said tube;
   a leader line extending through said forward end of said tube and attached to said eyelet so as to allow pivoting of said leader line with respect to an interior of said tube; and a weight positioned in said notch said weight is a dumbbell which is lashed in said notch.

2. The fly fishing lure of claim 1, wherein said tube is configured so as to allow fluid flow through said tube from said forward end toward and out of said back end during use.

3. The fly fishing lure of claim 1, wherein said leader line is attached to said eyelet so as to allow said leader line to traverse an angle with respect to said interior of said tube equal to at least an angle between a line extending from a center of a front edge of said eyelet to a top side of said forward end of said interior to a line extending from said center of said front edge of said eyelet to a bottom side of said forward end of said interior.

4. The fly fishing lure of claim 1, wherein said lip extends downward from said hollow tube at an angle to a major axis of said tube that is less than 90 degrees.

5. The fly fishing lure of claim 4, wherein said angle is greater than 45 degrees.

6. The fly fishing lure of claim 1, wherein said lip is formed integrally with said tube.

7. The fly fishing lure of claim 1, wherein said lip comprises a circular concave disk.

8. The fly fishing lure of claim 1, further comprising a hollow sleeve attached to said back end of said hollow tube, said sleeve removably holding said eyelet.

9. The fly fishing lure of claim 8, wherein said sleeve is configured to allow fluid flow from said back end of said tube through and out of said sleeve during use.

10. A method of making an artificial fly fishing lure, comprising the steps of:
    providing a hollow tube having a forward end, a back end opposite said forward end, and a downwardly projecting lip adjacent said forward end of said tube; wherein said hollow tube further comprises a notch on an exterior bottom wall of said hollow tube configured to hold a weight on the exterior of said tube,
    positioning said weight in said notch, and thereafter lashing said weight to said tube;
    extending a leader line through said hollow tube from said forward end through said back end;
    tying an eyelet of a hook to said leader line adjacent said back end of said tube; and
    positioning said eyelet of said hook with respect to an interior of said tube so that said leader line extends from approximately the center of said tube adjacent said back end towards said forward end of said tube.

11. The method of claim 10, wherein said tube is configured so as to allow fluid flow through said tube from said forward end toward and out of said back end during use.

12. The method of claim 10, wherein said tying and positioning steps allow said leader line to traverse an angle with respect to said interior of said tube equal to at least an angle between a line extending from a center of a front edge of said eyelet to a top side of said forward end of said interior to a line extending from said center of said front edge of said eyelet to a bottom side of said forward end of said interior.

13. The method of claim 10, wherein said lip extends downward from said hollow tube at an angle to a major axis of said tube that is less than 90 degrees.

14. The method of claim 13, wherein said angle is greater than 45 degrees.

15. The method of claim 10, wherein said lip is formed integrally with said tube.

16. The method of claim 10, wherein said lip comprises a circular concave disk.

17. The method of claim 10, further comprising the step of providing a sleeve on said back end of said hollow tube, and said positioning step further comprising removably positioning said eyelet of said hook inside of said sleeve.

18. The method of claim 17, wherein said sleeve is configured to allow fluid flow from said back end of said tube through and out of said sleeve during use.

* * * * *